United States Patent [19] [11] 4,174,359

Sivaramakrishnan et al. [45] Nov. 13, 1979

[54] FLAME RETARDANT POLYCARBONATE POLYBLENDS

[75] Inventors: Parameswar Sivaramakrishnan; Arthur L. Baron, both of New Martinsville, W. Va.

[73] Assignee: Mobay Chemical Corporation, Pittsburgh, Pa.

[21] Appl. No.: 891,252

[22] Filed: Mar. 29, 1978

Related U.S. Application Data

[63] Continuation-in-part of Ser. No. 830,518, Sep. 6, 1977, abandoned.

[51] Int. Cl.$^2$ ............................................. C08L 67/00
[52] U.S. Cl. .................................... 525/1; 260/45.7 R; 260/45.7 L; 260/45.85 R; 260/45.85 T; 260/45.95 G; 260/873; 528/198; 528/204; 528/426; 528/491; 528/492; 528/493; 525/150; 525/132
[58] Field of Search ............... 260/860, 866, 869, 873, 260/45.7 R, 45.7 L, 45.85 R, 45.85 T, 45.95 G; 528/204, 198, 486, 493, 491, 492

[56] References Cited

U.S. PATENT DOCUMENTS

| 3,250,744 | 5/1966 | Schnell et al. | 528/204 |
| 3,398,212 | 8/1968 | Jackson, Jr. et al. | 260/860 |
| 3,912,687 | 10/1975 | Haupt et al. | 260/860 |
| 3,978,024 | 8/1976 | Mark | 260/45.85 T |

Primary Examiner—J. Ziegler
Attorney, Agent, or Firm—Gene Harsh; Lawrence S. Pope; Frederick H. Colen

[57] ABSTRACT

The present invention pertains to a halogen-containing, copolycarbonate blend having improved critical thickness and flammability properties comprising an aromatic copolycarbonate comprising the reaction product of an aromatic diphenol, an aromatic thiodiphenol and a carbonic acid derivative, such as phosgene or carbonyl bromide, blended with an effective amount of a halogen-containing compound. In a preferred embodiment, the copolycarbonate blend also contains small amounts of a perfluoro sulfonic or carboxylic acid salt.

31 Claims, No Drawings

FLAME RETARDANT POLYCARBONATE POLYBLENDS

This application is a continuation-in-part application of our copending application Ser. No. 830,518, filed Sept. 6, 1977, abandoned.

FIELD OF THE INVENTION

This invention relates to copolycarbonate blends and more particularly to flame retardant copolycarbonate blends having improved critical thickness values and improved flame retardant properties.

BACKGROUND OF THE INVENTION

Polycarbonates derived from reactions involving organic dihydroxy compounds and carbonic acid derivatives have found extensive commercial application because of their excellent mechanical and physical properties. These thermoplastic polymers are particularly suited for the manufacture of molded article products for which impact strength, rigidity, toughness, thermal and dimensional stability as well as excellent electrical properties are required.

However, one deficiency of polycarbonate when used in molded articles is the low critical thickness values of polycarbonate polymer, which deficiency tends to limit wall thickness to a value below the critical thickness.

It is known that polycarbonate plastics exhibit high notched Izod (ASTM D-256) impact values. This value, however, is dependent upon the thickness of the test specimen. Typical notched Izod impact values for a $\frac{1}{8}''$ specimen are about 16 ft.-lbs. per inch. These high Izod values result because specimens of $\frac{1}{8}''$ thickness are thinner than the critical thickness of the polymer and, therefore, upon impact a hinged or ductile break occurs. On the other hand, $\frac{1}{4}''$ specimens exhibit a clean or brittle break and give notched Izod impact values of only about 2.5 ft.-lbs. per inch. The $\frac{1}{4}''$ specimens are said to be above the critical thickness of the polymer. "Critical thickness" has been defined as the thickness at which a discontinuity in Izod impact values occurs. In other words, it is the thickness at which a transitiion from a brittle to a ductile break or vice versa occurs. Thus, a standard impact specimen of polycarbonate polymer thicker than the critical thickness exhibits brittle breaks and those thinner than the critical thickness exhibit hinged or ductile breaks. Further, the critical thickness of a polycarbonate based on bisphenol A with a melt flow of 3 to 6 grams/10 minutes at 300° C. (ASTM D-1238) is about 225 mils.

The critical thickness problem is further complicated when the polycarbonate article is to meet a specified requirement for flammability in applications where high temperature and/or exposure to fire may be encountered. Conventional polycarbonate copolymers based on an aromatic diol and a halogenated diol reacted with a carbonic acid derivative are accepted as effective fire retardant polymers (V-0 at $\frac{1}{8}''$ thickness according to UL Subject 94). These copolycarbonates exhibit generally acceptable physical properties along with complying with flammability requirements. However, the critical thickness of copolycarbonates employing halogenated diols is very low, for example about 130–140 mils with a polymer containing about 5 to 6 percent by weight bromine in the form of a halogenated diol. Furthermore, these copolycarbonates may be opaque when used in thin thicknesses (about 1/16"). This opacity increases as the thickness of the section increases.

Ever more demanding polycarbonate applications have required further improved flame retardancy, but the incorporation of even 12 wt. % halogen into a conventional polycarbonate or copolycarbonate yields a composition which is V-0 at $\frac{1}{8}''$ thickness, but which is still V-2 at 1/16" thickness according to UL Subject 94. Such a composition exhibits inferior mechanical properties, especially critical thickness values, as compared to conventional polycarbonates and is generally opaque.

Polycarbonate compositions with further improved flame retardancy and good mechanical properties are, therefore, required.

In accordance with the present invention, an aromatic copolycarbonate blend is provided which has improved critical thickness, improved flammability properties and is highly transparent.

SUMMARY OF THE INVENTION

A halogen-containing, copolycarbonate blend having improved critical thickness values and flammability properties is provided comprising an aromatic copolycarbonate comprising the reaction product of an aromatic diphenol, an aromatic thiodiphenol and a carbonic acid derivative, such as phosgene or carbonyl bromide, blended with an effective amount of a halogen-containing compound. In a preferred embodiment, the copolycarbonate blend also contains small amounts of a perfluoro sulfonic or carboxylic acid salt.

DETAILED DESCRIPTION OF THE INVENTION

The copolycarbonates of the invention may be prepared by conventional methods of preparation for polycarbonate resins and may have a weight average molecular weight of about 10,000 to 200,000, preferably about 20,000 to 80,000, and particularly may have a melt flow rate of about 1 to 24 grams/10 min., most particularly about 2–6 grams/10 min., at 300° C. according to ASTM D-1238.

Any suitable process, reactant, catalyst, solvent, reaction condition and the like for the production of the copolycarbonates of this invention which are customarily employed in polycarbonate resin syntheses may be used such as disclosed in German Pat. Nos. 962,274 and 1,046,311 and U.S. Pat. Nos. 2,964,794, 2,970,131; 2,991,273; 2,999,835; 2,999,846; 3,028,365; 3,153,008; 3,187,065; 3,215,668; and 3,248,414, all incorporated herein by reference. The preferred process is the interfacial polycondensation process.

According to the interfacial polycondensation process, copolycarbonates are obtained by reacting the aromatic dihydroxy compounds with an alkali metal hydroxide or alkaline earth metal oxide or hydroxide to form the salt of the hydroxy compounds. The salt mixture is present in an aqueous solution or suspension and is reacted with phosgene, carbonyl bromide, or bischloroformic esters of the aromatic dihydroxy compounds. An organic solvent is provided in the reaction admixture which is a solvent for the polymer but not for the aromatic dihydroxy salts. Thus, chlorinated and non-chlorinated aliphatic hydrocarbons or chlorinated or non-chlorinated aromatic hydrocarbons are used as the organic solvent which dissolves the condensation product. Suitable solvents include cyclohexane, methylcyclohexane, benzene, toluene, xylene, methylene chloride, chloroform, carbon tetrachloride and chlorobenzene.

In order to limit the molecular weight one may use monofunctional reactants such as monophenols, for example the propyl-, isopropyl- and butyl-phenols, especially p-tert.-butyl-phenol and phenol itself. In order to accelerate the reaction, catalysts such as tertiary amines, quaternary ammonium, phosphonium or arsonium salts and the like may be used. The reaction temperature should be about $-20°$ to $+150°$ C., preferably about $0°$ C. to $100°$ C.

According to the polycondensation process in a homogeneous phase, the dissolved reaction components are polycondensed in an inert solvent in the presence of an equivalent amount of a tertiary amine base required for absorption of the generated HCl, such as N,N-dimethylaniline, N,N-dimethyl-cyclohexylamine or preferably pyridine and the like. In still another process, a diaryl carbonate can be transesterified with the aromatic dihydroxy compounds to form the polycarbonate.

It is to be understood that it is possible to combine in a chemically meaningful way in the processes described above both the aromatic dihydroxy compounds and the monohydroxy compounds in the form of the alkali metal salts and/or bis-haloformic acid esters and the amount of phosgene or carbonyl bromide then still required in order to obtain high molecular products. Other methods of synthesis in forming the copolycarbonate of the invention such as disclosed in U.S. Pat. No. 3,912,688, incorporated herein by reference, may also be used.

The aromatic diphenols useful in the practice of the invention include the following compounds: hydroquinone, resorcinol, dihydroxydiphenyls, bis-(hydroxyphenyl)-alkanes, bis-(hydroxyphenyl)-cycloalkanes, bis-(hydroxyphenyl)-ethers, bis-(hydroxyphenyl)-ketones, bis-(hydroxyphenyl)-sulphoxides, bis-(hydroxyphenyl)-sulphones and α,α-bis-(hydroxyphenyl)-diisopropyl-benzenes, as well as their nuclear-alkylated compounds. These and further suitable aromatic dihydroxy compounds are described, for example, in U.S. Pat. Nos. 3,028,365, 2,999,835, 3,148,172, 3,271,368, 2,991,273, 3,271,367, 3,280,078, 3,014,891 and 2,999,846 (all incorporated herein by reference), in German Offenlegungsschriften (German Published Specifications) Nos. 1,570,703; 2,063,050, 2,063,052; 2,211,956 and 2,211,957, in French Patent Specification 1,561,518 and in the monograph "H. Schnell, Chemistry and Physics of Polycarbonates, Interscience Publishers, New York, 1964".

Preferred aromatic diphenols are those of the formula

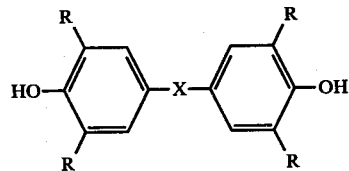

in which
R is identical or different and denotes H or $C_1$–$C_4$-alkyl and in which
X is a bond, $C_1$–$C_8$-alkylene, $C_2$–$C_8$-alkylidene, $C_5$–$C_{15}$-cycloalkylene, $C_5$–$C_{15}$-cycloalkylidene, $-SO_2-$, $-SO-$, $-CO-$ or

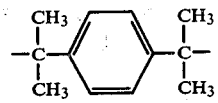

Examples of these diphenols are: 4,4'-dihydroxydiphenyl, 2,2-bis-(4-hydroxyphenyl)-propane (bisphenol A), 2,4-bis-(4-hydroxyphenyl)-2-methylbutane, 1,1-bis-(4-hydroxyphenyl)-cyclohexane, α,α-bis-(4-hydroxyphenyl)-p-diisopropylbenzene, 2,2-bis-(3-methyl-4-hydroxyphenyl)-propane, bis-(3,5-dimethyl-4-hydroxyphenyl)-methane, 2,2-bis-(3,5-dimethyl-4-hydroxyphenyl)-propane, bis-(3,5-dimethyl-4-hydroxyphenyl)-sulphone, 2,4-bis-(3,5-dimethyl-4-hydroxyphenyl)-2-methyl-butane, 1,1-bis-(3,5-dimethyl-4-hydroxyphenyl)-cyclohexane and α,α-bis-(3,5-dimethyl-4-hydroxyphenyl)-p-diisopropyl-benzene.

Examples of particularly preferred aromatic diphenols are: 2,2-bis-(4-hydroxyphenyl)-propane, 2,2-bis-(3,5-dimethyl-4-hydroxyphenyl)-propane, and 1,1-bis-(4-hydroxyphenyl)-cyclohexane.

The most preferred aromatic diphenol is 2,2-bis-(4-hydroxyphenyl)-propane (bisphenol A).

The aromatic thiodiphenols useful in the practice of the invention are those represented by the structural formula

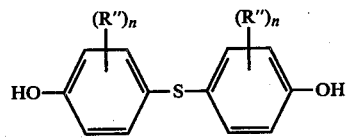

wherein
R'', which may be identical or different, is H, or $C_1$–$C_4$-alkyl, preferably H, and
n is 0, 1 or 2.

The preferred aromatic thiodiphenol is 4,4'-thiodiphenol.

The aromatic diphenol-aromatic thiodiphenol copolycarbonates of the present invention preferably contain from about 2 to 50 mol %, most preferably about 5 to 40 mol %, of the aromatic thiodiphenol, based on the total mols of diphenols. Suitable aromatic diphenol-aromatic thiodiphenol copolycarbonates are described in co-pending U.S. patent application Ser. No. 872,393, filed Jan. 25, 1978, in the names of Arthur L. Baron and Parameswar Sivaramakrishnan and in U.S. Pat. No. 3,250,774, both incorporated herein by reference.

The aromatic copolycarbonates can be branched due to the incorporation of small amounts, preferably of between about 0.05 and 2.0 mol % (relative to diphenols employed), of trifunctional or more than trifunctional compounds, especially compounds with three or more phenolic hydroxyl groups.

Polycarbonates of this type are described, for example, in German Offenlegungsschriften (German Published Specifications) Nos. 1,570,533, 1,595,762, 2,116,974 and 2,113,347, British Patent Specification 1,079,821 and U.S. Patent Specification No. 3,544,514 (incorporated herein by reference).

Some examples of compounds with three or more than three phenolic hydroxyl groups which can be used are phloroglucinol, 4,6-dimethyl-2,4,6-tri-(4-hydroxyphenyl)-heptane, 2,4,6-trimethyl-2,4,6-tri-(4-hydroxyphenyl)-heptane, 1,4,5-tri-(4-hydroxyphenyl)-benzene, 1,1,1-tri-(4-hydroxyphenyl)-ethane, tri-(4-hydroxyphenyl)-phenylmethane, 2,2-bis[4,4-bis-(4-hydroxyphenyl)-cyclohexyl]-propane, 2,4-bis-(4-hydroxyphenylisopropyl)-phenol, 2,6-bis-(2-hydroxy-5'-methylbenzyl)-4-methylphenol, 2-(4-hydroxyphenyl)-2-(2,4-dihydroxyphenyl)-propane, hexa(4-(4-hydroxyphenylisopropyl)-phenyl) orthoterephthalic acid ester, tetra-(4-hydroxyphenyl)-methane, tetra-(4-(4-hydroxyphenylisopropyl)-phenoxy)-methane and 1,4-bis-((4',4''-dihydroxytriphenyl)-methyl)-benzene. Some of the other trifunctional compounds are 2,4-dihydroxy-benzoic acid, trimesic acid, cyanuric chloride and 3,3-bis-(4-hydroxyphenyl)-2-oxo-2,3-dihydroindole.

The aromatic copolycarbonates of the invention are intimately blended with an effective amount of a halogen-containing compound, preferably a bromine- or chlorine-containing compound, to yield an aromatic copolycarbonate blend which exhibits improved critical thickness, improved flammability properties and good transparency, even at 1/6" thickness. Preferably, the halogen content of the aromatic copolycarbonate blend is from about 0.01 to 8 wt. %, most preferably from about 1 to 5 wt. %, based on the weight of the aromatic copolycarbonate blend.

Any suitable organic compound containing halogen atoms, preferably chlorine or bromine, may be used in the practice of the invention. It may be present as an additive in the aromatic copolycarbonate blend.

In a preferred embodiment, the halogen-containing compound is an aromatic diphenol-halogenated aromatic diphenol copolycarbonate preferably having a halogen content of from about 3 to 10 percent by weight, most preferably from about 6 to 10 percent by weight, based on the weight of the aromatic diphenol-halogenated aromatic diphenol copolycarbonate. These halogenated copolycarbonate compounds are prepared in a manner similar to the preparation of the aromatic diphenol-aromatic thiodiphenol copolycarbonates discussed above.

The aromatic diphenols discussed above may be used as the aromatic diphenol component in the preparation of these halogenated copolycarbonates.

The halogenated aromatic diphenols useful in the preparation of the halogenated copolycarbonate compounds include the nuclear-halogenated embodiments of the aromatic diphenols discussed above. These and further suitable aromatic dihydroxy compounds are also described, for example, in U.S. Pat. Nos. 3,028,365; 2,999,835; 3,148,172; 3,271,368, 2,991,273, 3,271,367; 3,280,078; 3,014,891 and 2,999,846 (all incorporated herein by reference), and 2,999,846 (all incorporated herein by reference), in German Offenlegungsschriften (German Published Specifications) Nos. 1,570,703; 2,063,050; 2,063,052; 2,211,956 and 2,211,957, in French Pat. Specification No. 1,561,518 and in the monograph "H. Schnell, Chemistry and Physics of Polycarbonates, Interscience Publishers, New York, 1964".

Preferred halogenated aromatic diphenols are those of the formula

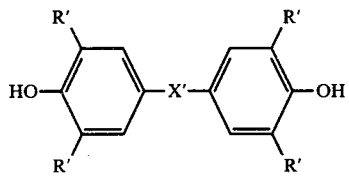

in which
R' is identical or different and denotes H, $C_1$–$C_4$-alkyl or halogen, preferably Cl or Br, and at least one R' is halogen and in which
X' is a bond, $C_1$–$C_8$-alkylene, $C_2$–$C_8$-alkylidene, $C_5$–$C_{15}$-cycloalkylene, $C_5$–$C_{15}$-cycloalkylidene, —$SO_2$—, —SO—, —CO— or

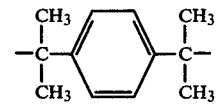

Examples of these halogenated aromatic diphenols are: 2,2-bis-(3,5-dichloro-4-hydroxyphenyl)-propane, 2,2-bis-(3,5-dibromo-4-hydroxyphenyl)-propane (tetrabromobisphenol A), 2,2-bis-(3-chloro-4-hydroxyphenyl)-propane, 2,2-bis-(3-bromo-4-hydroxyphenyl)-propane, 2,2-bis-(3-bromo-5-methyl-4-hydroxyphenyl)-propane and 2,2-bis-(3-chloro-5-methyl-4-hydroxyphenyl)-propane.

Examples of particularly preferred halogenated aromatic diphenols are: 2,2-bis-(3,5-dichloro-4-hydroxyphenyl)-propane and 2,2-bis-(3,5-dibromo-4-hydroxyphenyl)-propane.

The most preferred halogenated aromatic diphenol is 2,2-bis-(3,5-dibromo-4-hydroxyphenyl)-propane.

In addition to forming copolycarbonates from the aromatic diphenols and halogenated aromatic diphenols, homopolycarbonates may also be formed from the halogenated aromatic diphenols discussed above and used as the halogen-containing compounds of the invention.

In another embodiment of the invention, any monomeric halogen-containing compound which will not deleteriously affect the copolycarbonate and which contains at least one halogen atom, but preferably 2 to 10 halogen atoms, may be used in the invention.

Examples of some suitable monomeric halogen-containing compounds include compounds such as, tetrabromobutane, tetrabromoethane, 1-bromooctane tribromopropane, octachloropropane, hexachloroethane, tribromobutane, 1,2,3,4,5,6-hexachloro-cyclohexane, and the like; suitable halogenated aromatic hydrocarbons such as, for example, dichlorobiphenyl (o), (m), (p), a-naphthyl chloride, b-naphthyl chloride, p-bromoacetophenone, a-bromobiphenyl, p-bromobiphenyl, p-bromodiphenyl ether, bromoiodobenzene (o), (m), (p), a-naphthyl bromide, b-naphthyl bromide, b-bromophenetole, 9-bromophenanthrene, p-iodobiphenyl, a-naphthyliodide, b-napthyliodide, 4,4'-bromobiphenyl, 4,4'-dibromobiphenyl ether, decabromodiphenyl ether, 4,4'-dichlorobenzophenone 3,3'-dichlorobiphenyl, 4,4'-dichlorobiphenyl, 1,3-dichloronaphthalene, 1,4-dichloronaphthalene, 1,5-dichloronaphthalene, 1,7-dichloronaphthalene, 2,6-dichloronaphthalene, o, m and p-diiodobenzene, 1,2,4-tribromobenzene, 1,3,5-tribromobenzene, 1,2,3,5-tetrabromobenzene, pentabromobenzene, pentachlorobenzene, chloroacenaphthene, 2,7-dibromofluorene, tetrabromophthalic anhydride, pentachloroethylbenzene, hexabromobenzene and the like. Corresponding chloro, fluoro, bromo and iodo, preferably chloro and bromo, isomers thereof may be used in the practice of this invention.

In addition, an ester containing at least one halogen atom may be used in admixture with the aromatic diphenol-aromatic thiodiphenol copolycarbonate to impart flame resistant properties to the blend. For example, the esters obtained from halogenated acids, anhydrides and monohydric alcohols or polyhydric alcohols may be used. Suitable halogenated organic esters are chloroacetic acid esters, fluoroacetic acid esters, bromoacetic acid esters, halophthalic acid esters such as dimethyltetrabromophthalate, diethyltetrabromophthalate, di-n-propyltetrachlorophthalate, di-n-octyldichlorophthalate and the like and mixtures thereof.

Further, mixtures of any of the foregoing halogenated materials may be used as well as a combination of halogenated additives and a halogen-containing polycarbonate polymer.

In a preferred embodiment of the present invention, the aromatic copolycarbonate blend also contains small amounts of a sulfonic or carboxylic acid salt. Preferably, the sulphonic or carboxylic acid salt is present in the blend in from about 0.01 to 3 percent by weight, most preferably from about 0.05 to 1 percent by weight, based on the weight of the aromatic copolycarbonate blend. Most preferably, the sulfonic or carboxylic acid salt is perfluorinated.

Suitable sulfonic acid salts which may be used are disclosed in U.S. Pat. No. 3,775,367, incorporated herein by reference, and include perfluoroalkane alkali metal sulfonates and perfluoroalkane ammonium sulfonates, preferably those containing from about four to eight carbon atoms in the alkyl group. Suitable examples of such salts include, for example, sodium and potassium perfluorobutane sulphonate, sodium and potassium perfluoromethylbutane sulfonate, sodium and potassium perfluorooctane sulfonate, sodium and potassium perfluoromethane sulfonate, sodium and potassium perfluoroethane sulfonate, sodium and potassium perfluoropropane sulfonate, sodium and potassium perfluorohexane sulfonate, sodium and potassium perfluoroheptane sulfonate, tetraethylammonium perfluorobutane sulfonate, tetraethylammonium perfluoromethylbutane sulphonate and the like and mixtures thereof. The corresponding chloro-, bromo- and iodo-organic acid salts may also be used.

Examples of suitable carboxylic acid salts in the sense of the invention are the alkali metal salts, especially the sodium salts and potassium salts, of aliphatic, aromatic or aliphatic-aromatic monobasic or dibasic, optionally halogenated, carboxylic acids with 1 to 24 carbon atoms, such as those of formic acid, acetic acid, propionic acid, butyric acid, isobutyric acid, valeric acid, caproic acid, oenanthic acid, caprylic acid, pelargonic acid, capric acid, lauric acid, stearic acid, behanic acid, 5-ethyl-dioxan-1,3-yl-5-carboxylic acid, 3-(3,5-di-tert.-butyl-4-hydroxyphenyl)propionic acid, oleic acid, oxalic acid, malonic acid, succinic acid, glutaric acid, adipic acid, pimelic acid, sebacic acid, benzoic acid and its p-alkylated derivatives with 1 to 8 carbon atoms in the alkyl radical, salicyclic acid, terephthalic acid, isophthalic acid, phthalic acid monobenzyl ester, diglycolic acid monodecyl ester, adipic acid monobutyl ester and 3-chlorobenzoic acid.

Such sulfonic or carboxylic acid salts or mixtures thereof may be added to the polycarbonate during its preparation or they may be added to the melt of the finished polycarbonate by homogenization using an extruder, for example, or by any other suitable means which will ensure a thorough distribution of the additives of this invention in the polycarbonate resin. Some such suitable methods are described, for example, in U.S. Pat. No. 3,509,091, incorporated herein by reference.

The copolycarbonates of the present invention may also contain other conventional resin additives such as glass fibers, pigments, dyes, UV stabilizers, thermal stabilizers, mold release agents and fillers. Examples of such suitable additives are discussed in the text *Chemistry and Physics of Polycarbonates* by Hermann Schnell, Interscience Publishers, New York, 1964 and in the text Polycarbonates by W.F. Christopher and D. W. Fox, Reinhold Publishing Corp., New York, 1962.

Any additives, including the sulfonic or carboxylic acid salts and halogen-containing compounds, may be blended with the copolycarbonate in known mixing devices such as kneaders, single-screw extruders, twin-screw extruders, mills and the like.

The halogenated aromatic diphenols hereinbefore discussed are known to impart flame retardant characteristics to polycarbonates which are synthesized therefrom. Furthermore, it is known from U.S. Pat. No. 3,912,688 that sulfur containing aromatic diphenols when used in combination with the halogenated aromatic diphenols to synthesize polycarbonates produce a flame retardant product which is superior to polycarbonates based on sulfur containing aromatic diphenols or halogen containing aromatic diphenols alone. The sulfur containing aromatic diphenols taught by the prior art to produce these synergistic flammability characteristics are the bis-hydroxysulfones (see U.S. Pat. No. 3,912,688). However, these terpolycarbonates synthesized from the aromatic diphenol, the halogenated aromatic diphenol and the bis-hydroxysulfones exhibit low critical thickness values.

Surprisingly, the halogen-containing, copolycarbonate blends of the invention not only exhibit the flame retardant synergism of sulfur and halogen (V-0 at 1/16" according to UL Subject 94), but also exhibit improved critical thickness values as compared to the critical thickness values exhibited by conventional halogen containing co- and homopolycarbonates, such as aromatic diphenol-halogenated aromatic diphenol copolycarbonate. Such an improvement in critical thickness is quite surprising and unexpected because it is known that the critical thickness of polycarbonate copolymers based on aromatic diphenols and halogenated aromatic diphenols is significantly lower than the critical thickness of polycarbonates based solely on an aromatic diphenol. This difference in critical thickness is attributable to the detrimental effect of the halogen atoms. Thus, the combination of the aromatic diphenol-aromatic thiodiphenol copolycarbonate with the halogen-containing compound unexpectedly overcomes this detrimental effect of the halogen atoms and results in halogen-containing copolycarbonate blends having improved critical thickness values and improved flammability properties.

The invention will be further illustrated, but is not intended to be limited, by the following examples.

EXAMPLES

Preparation of an aromatic diphenol-halogenated aromatic diphenol copolycarbonate An aromatic diphenol-halogenated aromatic diphenol copolycarbonate was prepared by reacting a mixture of the disodium salts of 2,2-bis-(4-hydroxyphenyl)-propane (BPA) and 2,2-bis-(3,5-dibromo-4-hydroxyphenyl)-propane (TBBPA) with phosgene in accordance with the interfacial polycondensation synthesis hereinbefore discussed. The resulting copolycarbonate resin had a bromine content of about 9 percent by weight and a melt index of 5.9 gm/10 min. (ASTM D-1238).

Preparation of aromatic diphenol-aromatic thiodiphenol copolycarbonates (A) An aromatic diphenol-aromatic thiodiphenol copolycarbonate was prepared by reacting a 60/40 mol % mixture of the disodium salts of 2,2-bis-(4-hydroxyphenyl)propane (BPA) and 4,4'-thiodiphenol (TDP) with phosgene in accordance with the interfacial polycondensation synthesis hereinbefore discussed. The resulting copolycarbonate had a melt index of 7.4 gm/10 min. (ASTM D-1238).

(B) An aromatic diphenol-aromatic thiodiphenol copolycarbonate was prepared as in (A) above except that a 70/30 mol % BPA/TDP mixture was used. The resulting copolycarbonate had a melt index of 5.7 gm/10 min. (ASTM D-1238).

(C) An aromatic diphenol-aromatic thiodiphenol copolycarbonate was prepared as in (A) above except that a 80/20 mol % BPA/TDP mixture was used. The resulting copolycarbonate had a melt index of 2.5 gm/10 min. (ASTM D-1238).

(D) A copolycarbonate having a melt index of 7.2 g/10 min. was prepared by reacting a mixture of the disodium salt of 2,2-bis-(4-hydroxyphenyl)-propane (bisphenol A) (BPA) and 4,4'-thiodiphenol (TDP) with phosgene in accordance with the interfacial polycondensation synthesis hereinbefore discussed. 85 mol % of bisphenol A and 15 mol % of 4,4'-thiodiphenol, based on the total mols of dihydroxyl compounds, were used.

EXAMPLE 1

The BPA/TBBPA copolycarbonate was blended with the BPA/TDP copolycarbonate prepared in (A) above in a 56/44 wt. % ratio. The polyblend was tested for impact, critical thickness and flammability properties with the test results reported in Table 1. The polyblend was found to be highly transparent.

EXAMPLE 2

The BPA/TBBPA copolycarbonate was blended with the BPA/TDP copolycarbonate prepared in (B) above in a 56/44 wt. % ratio. The test results of the Example 2 polyblend are reported in Table 1. The polyblend was found to be highly transparent.

EXAMPLE 3

The BPA/TBBPA copolycarbonate was blended with the BPA/TDP copolycarbonate prepared in (C) above in a 56/44 wt. % ratio. The test results of the Example 3 polyblend are reported in Table 1. The polyblend was found to be highly transparent.

EXAMPLE 4 (Comparison)

The BPA/TBBPA copolycarbonate was blended with a BPA polycarbonate having a melt index of 3–5.9 gm/10 min. (ASTM D-1238) in a 56/44 wt. % ratio. The test results of the Example 4 comparison polyblend are reported in Table 1.

TABLE 1
POLYBLENDS OF BPA/TBBPA COPOLYCARBONATE AND BPA/TDP COPOLYCARBONATE

| Properties | Ex. 1 | Ex. 2 | Ex. 3 | Example 4 Comparison |
|---|---|---|---|---|
| % Bromine | 5.0 | 5.0 | 5.0 | 5.0 |
| % Sulfur | 2.63 | 1.77 | 1.06 | 0.00 |
| 1/8" Impact, notched[1] ft. lbs/in. | 14.73 | 14.83 | 15.84 | 11.86 |
| 1/4" Impact, notched[1] ft. lbs/in. | 2.33 | 2.26 | 2.16 | 2.03 |
| Critical Thickness[1] (mils) | 170 | 165 | 155 | 135 |
| Melt Index, g/10 min.[2] | 7.3 | 4.8 | 3.3 | 4.1 |
| UL-94 (1/8")[3] | V-0 | V-0 | V-0 | V-0 |
| (Avg. Burn Time sec.) | (0.9) | (0.6) | (0.6) | (0.7) |
| UL-94 (1/16")[3] | V-0 | V-0 | V-0 | V-2 |
| (Avg. Burn Time sec.) | (3.0) | (3.2) | (2.1) | |

[1]ASTM D-256
[2]ASTM D-1238
[3]Underwriters Laboratories, Inc. Test 94: Standard for tests for flammability of plastic materials for parts in devices and appliances.

EXAMPLE 5

The BPA/TDP (85/15) copolycarbonate prepared in (D) was intimately blended with 0.10 weight % of potassium perfluorobutane sulfonate, based on the weight of the copolycarbonate blend and then extruded, pelletized and molded into standard test samples for evaluation of physical properties. The properties measured are reported in Table 2.

EXAMPLE 6

Copolycarbonate (D) was intimately blended with a sufficient quantity of decabromodiphenyl ether to provide the copolycarbonate blend with a 5 wt. % bromine content, based on the weight of the copolycarbonate blend. The properties measured are reported in Table 2. The molded copolycarbonate blend was found to be highly transparent at a 1/16" thickness. Additionally, the molded copolycarbonate blend was found to be highly transparent at a 1/16" thickness.

EXAMPLE 7

Copolycarbonate (D) was intimately blended with 0.10 wt. % of potassium perfluorobutane sulfonate and a sufficient quantity of decabromodiphenyl ether to provide the copolycarbonate blend with a 5 weight % bromine content, based on the weight of the copolycarbonate blend. The properties measured are reported in Table 2. Additionally, the molded copolycarbonate blend was found to be highly transparent at a 1/16" thickness.

EXAMPLE 8

Copolycarbonate (D) was intimately blended only with a sufficient quantity of decabromodiphenyl ether to provide the copolycarbonate blend with a 4 weight % bromine content, based on the weight of the copolycarbonate blend. The properties measured are reported in Table 2.

EXAMPLE 9

Copolycarbonate (D) was intimately blended with 0.10 weight % of potassium perfluorobutane sulfonate and a sufficient quantity of decabromodiphenyl ether to provide the copolycarbonate blend with a 4 weight % bromine content, based on the weight of the copolycarbonate blend. The properties measured are reported in Table 2. Additionally, the molded copolycarbonate blend was found to be highly transparent at a 1/16" thickness.

EXAMPLE 10

Copolycarbonate (D) was intimately blended only with a sufficient quantity of decabromodiphenyl ether to provide the copolycarbonate blend with a 3 weight % bromine content, based on the weight of the copolycarbonate blend. The properties measured are repeated in Table 2.

EXAMPLE 11

Copolycarbonate (D) was intimately blended with 0.10 weight % of potassium perfluorobutane sulfonate and a sufficient quantity of decabromodiphenyl ether to provide the copolycarbonate blend with a 3 weight % bromine content, based on the weight of copolycarbonate blend. The properties measured are reported in Table 2. Additionally, the molded copolycarbonate blend was found to be highly transparent at a 1/16" thickness.

provide the copolycarbonate blend with a 2.0 weight % bromine content, based on the weight of the copolycarbonate blend. The properties measured are reported in Table 2. Additionally, the molded copolycarbonate blend was found to be highly transparent at a 1/16" thickness.

EXAMPLE 15

Copolycarbonate (D) was intimately blended only with a sufficient quantity of decabromodiphenyl ether to provide the copolycarbonate blend with a 1 weight % bromine content based on the weight of the copolycarbonate blend. The properties measured are reported in Table 2.

EXAMPLE 16

Copolycarbonate (D) was intimately blended with 0.10 weight % of potassium perfluorobutane sulfonate and a sufficient quantity of decabromodiphenyl ether to provide the copolycarbonate blend with a 1 weight % bromine content, based on the weight of the copolycarbonate blend. The properties measured are reported in Table 2. Additionally, the molded copolycarbonate blend was found to be highly transparent at a 1/16" thickness.

TABLE 2

Physical Properties of BPA/TDP (85/15) Copolycarbonates Containing A Bromine Carrier and/or Potassium Perfluorobutane Sulfonate

| Example Number | ADDITIVES WT. % | | Melt Flow Rate g/10 Min. | UL-94 (1/16") | | Oxygen Index, % | Notched Izod Impact | | Critical Thickness (Mils) |
|---|---|---|---|---|---|---|---|---|---|
| | Potassium Perfluoro-butane Sulfonate | % Br Derived From Deca-bromo Diphenyl Ether | | Rating | Avg. Burn Time, Secs. | | 1/8" | 1/4" | |
| 5  | 0.10 | —   | 8.5 | V-2         | —   | —     | 14.04 | 7.62 | 243 |
| 6  | —    | 5.0 | —   | V-0         | 3.4 | 29.50 | 15.18 | 2.26 | 205 |
| 7  | 0.10 | 5.0 | 9.5 | V-0         | 2.1 | 38.1  | 15.82 | 2.14 | 175 |
| 8  | —    | 4.0 | —   | V-2         | —   | 29.2  | 15.26 | 2.53 | 195 |
| 9  | 0.10 | 4.0 | 9.0 | V-0         | 2.6 | 37.0  | 14.97 | 2.33 | 175 |
| 10 | —    | 3.0 | —   | V-2         | —   | 29.10 | 14.69 | 2.90 | 205 |
| 11 | 0.10 | 3.0 | 8.9 | V-0         | 3.0 | 37.0  | 14.69 | 2.48 | 195 |
| 12 | 0.10 | 2.5 | —   | V-0         | 3.6 | —     | —     | —    | —   |
| 13 | —    | 2.0 | —   | V-2         | —   | 28.93 | 14.87 | 3.40 | 225 |
| 14 | 0.10 | 2.0 | 8.7 | V-0         | 3.2 | 33.0  | 14.34 | 2.68 | 215 |
| 15 | —    | 1.0 | —   | V-2         | —   | —     | 14.34 | 5.53 | 235 |
| 16 | 0.10 | 1.0 | 8.5 | V-0+ (80%)  | 4.6 | 30.9  | 14.13 | 3.16 | 225 |

+4 out of 5 specimens used in standard testing procedure exhibited UL-94 (1/15") V-0 burning behavior.

EXAMPLE 12

Copolycarbonate (D) was intimately blended with 0.10 weight % of potassium perfluorobutane sulfonate and a sufficient quantity of decabromodiphenyl ether to provide the copolycarbonate blend with a 2.5 weight % bromine content, based on the weight of the copolycarbonate blend. The properties measured are reported in Table 2. Additionally, the molded copolycarbonate blend was found to be highly transparent at a 1/16" thickness.

EXAMPLE 13

Copolycarbonate (D) was intimately blended only with a sufficient quantity of decabromodiphenyl ether to provide the copolycarbonate blend with a 2 weight % bromine content, based on the weight of the copolycarbonate blend. The properties measured are reported in Table 2.

EXAMPLE 14

Copolycarbonate (D) was intimately blended with 0.10 weight % of potassium perfluorobutane sulfonate and a sufficient quantity of decabromodiphenyl ether to

EXAMPLE 17

BPA/TDP Copolycarbonate (D) was intimately blended with 0.10 weight % of potassium perfluorobutane sulfonate and a sufficient quantity of the bisphenol A/tetrabromobisphenol A copolycarbonate having a 9 weight % bromine content and a melt flow rate of 5.9 g/10 min. to provide the BPA/TDP copolycarbonate blend with a 2 weight % bromine content, based on the weight of the copolycarbonate blend. The properties measured are reported in Table 3. Additionally, the molded copolycarbonate blend was found to be highly transparent at a 1/16" thickness.

EXAMPLE 18

Example 17 was repeated except that the BPA/TDP copolycarbonate was intimately blended with 0.10 weight % of potassium perfluorobutane sulfonate and a sufficient quantity of the bisphenol A/tetrabromobisphenol A copolycarbonate to provide the BPA/TDP copolycarbonate blend with a 3 weight % bromine content, based on the weight of the copolycarbonate blend. The properties measured are reported in Table 3. Additionally, the molded copolycarbonate blend was found to be highly transparent at a 1/16" thickness.

EXAMPLE 19

Example 5 was repeated except that the BPA/TDP copolycarbonate was intimately blended with 0.10 weight % of potassium perfluorobutane sulfonate and a sufficient quantity of tetrabromobisphenol A homopolycarbonate having a number average molecular weight, Mn, of 4000 and a relative viscosity of 1.03 to provide the BPA/TDP copolycarbonate blend with a 1 weight % bromine content, based on the weight of the copolycarbonate blend. The properties measured are reported in Table 3. Additionally, the molded copolycarbonate blend was found to be highly transparent at a 1/16" thickness.

EXAMPLE 20

Example 19 was repeated except that the BPA/TDP copolycarbonate was intimately blended with 0.10 weight % of potassium perfluorobutane sulfonate and a sufficient quantity of the tetrabromobisphenol A homopolycarbonate to provide the BPA/TDP copolycarbonate blend with a 2 weight % bromine content, based on the weight of the copolycarbonate blend. The properties measured are reported in Table 3. Additionally, the molded copolycarbonate blend was found to be highly transparent at a 1/16" thickness.

EXAMPLE 21

Example 19 was repeated except that the BPA/TDP copolycarbonate was intimately blended with 0.10 weight % of potassium perfluorobutane sulfonate and a sufficient quantity of the tetrabromobisphenol A homopolycarbonate to provide the BPA/TDP copolycarbonate blend with a 3 weight % bromine content, based on the weight of the copolycarbonate blend. The properties measured are reported in Table 3. Additionally, the molded copolycarbonate blend was found to be highly transparent at a 1/16" thickness.

TABLE 3

UL-94 Combustibility Properites of BPA/TDP (85/15) Copolycarbonates Containing A Bromine Carrier and Potassium Perfluorobutane Sulfonate

| | ADDITIVES WT. % | | | |
|---|---|---|---|---|
| | Potassium | | UL-94 (1/16") | |
| Example Number | Perfluorobutane Sulfonate | % Br | Rating | Avg. Burn Time, Secs. |
| 17 | 0.10 | 2.0[1] | V-2 | — |
| 18 | 0.10 | 3.0[1] | V-0 | 2.1 |
| 19 | 0.10 | 1.0[2] | V-0 (80%)[3] | 3.2 |
| 20 | 0.10 | 2.0[2] | V-0 (80%)[3] | 3.4 |
| 21 | 0.10 | 3.0[2] | V-0 (80%)[3] | 2.6 |

[1]Bisphenol A/tetrabromobisphenol A copolycarbonate (9 weight % Br; melt flow rate: 5.9 g/10 min.)
[2]Tetrabromo homopolycarbonate ($M_n$ 4000, RV = 1.03)
[3]Four out of five specimens passed V-0

As is demonstrated by the foregoing examples, the halogen-containing, aromatic copolycarbonate blends of the invention exhibit both improved flame retardant characteristics and improved critical thickness values.

Although the invention has been described in detail in the foregoing for the purpose of illustration, it is to be understood that such detail is solely for that purpose and that variations can be made without departing from the spirit and scope of the invention except as it may be limited by the claims.

What is claimed is:
1. A halogen-containing aromatic copolycarbonate blend comprising
   (a) an aromatic diphenol-aromatic thiodiphenol copolycarbonate comprising the reaction product of
      (i) an aromatic diphenol having the structural formula

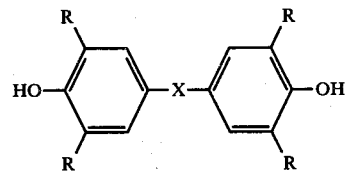

wherein
R is identical or different and denotes H or $C_1$-$C_4$-alkyl,
and
wherein
X is a bond, $C_1$-$C_8$-alkylene, $C_2$-$C_8$-alkylidene, $C_5$-$C_{15}$-cycloalkylene, $C_5$-$C_{15}$-cycloalkylidene, —SO$_2$—, —SO—, —CO— or

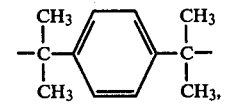

(ii) an aromatic thiodiphenol having the structural formula

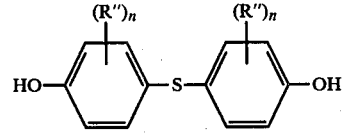

wherein
R", which may be identical or different, is H or $C_1$-$C_4$-alkyl, and n is 0, 1 or 2, and
   (iii) a member selected from the group consisting of carbonyl bromide, phosgene, bischloroformic esters of (i) and (ii) and diaryl carbonates
   (b) intimately blended with an effective amount of a halogen-containing compound whereby the critical thickness and flammability properties of the halogen-containing, aromatic copolycarbonate blend is improved.

2. The halogen-containing, aromatic copolycarbonate blend of claim 1 wherein said blend contains a sufficient amount of the halogen-containing compound to produce an about 0.01 to 8 wt. % halogen content, based on the weight of the aromatic copolycarbonate blend.

3. The halogen-containing, aromatic copolycarbonate blend of claim 1 wherein said halogen-containing compound is an aromatic diphenol-halogenated aromatic diphenol copolycarbonate comprising the reaction product of
   (i) an aromatic diphenol,
   (ii) a halogenated, aromatic diphenol, and (iii) a member selected from the group consisting of carbonyl bromide, phosgene, bischloroformic esters of (i) or (ii) and diaryl carbonates.

4. The halogen-containing, aromatic copolycarbonate blend of claim 3 wherein the aromatic diphenol of said aromatic diphenol-halogenated aromatic diphenol copolycarbonate is of the structural formula

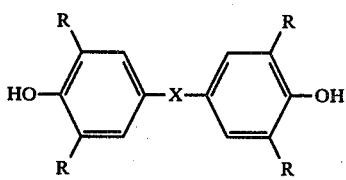

wherein
R is identical or different and denotes H or $C_1$–$C_4$-alkyl, and
wherein
X is a bond, $C_1$–$C_8$-alkylene, $C_2$–$C_8$-alkylidene, $C_5$–$C_{15}$-cycloalkylene, $C_5$–$C_{15}$-cycloalkylidene, —$SO_2$—, —SO—, —CO— or

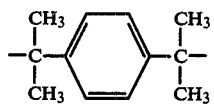

5. The halogen-containing, aromatic copolycarbonate blend of claim 3 wherein the halogenated aromatic diphenol of said aromatic diphenol-halogenated aromatic diphenol copolycarbonate is of the structural formula

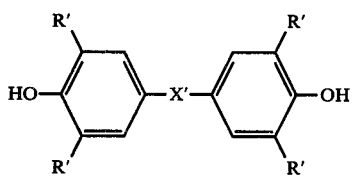

wherein
R' is identical or different and denotes H, $C_1$–$C_4$-alkyl or halogen, and at least one R' is halogen, and
wherein
X' is a bond; $C_1$–$C_8$-alkylene, $C_2$–$C_8$-alkylidene, $C_5$–$C_{15}$-cycloalkylene, $C_5$–$C_{15}$-cycloalkylidene, —$SO_2$—, —SO—, —CO— or

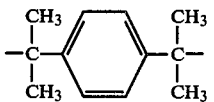

6. The halogen-containing, aromatic copolycarbonate blend of claim 3 wherein the aromatic diphenol-halogenated aromatic diphenol copolycarbonate has a halogen content of from about 3 to 10 percent by weight, based on the weight of the aromatic diphenol-halogenated aromatic diphenol copolycarbonate.

7. The halogen-containing, aromatic copolycarbonate blend of claim 3 wherein the aromatic diphenol of said aromatic diphenol-halogenated aromatic diphenol copolycarbonate is bisphenol A and the halogenated aromatic diphenol of said aromatic diphenol-halogenated aromatic diphenol copolycarbonate is tetrabromobisphenol A.

8. The halogen-containing, aromatic copolycarbonate blend of claim 1 wherein said halogen-containing compound is a halogenated homopolycarbonate.

9. The halogen-containing, aromatic copolycarbonate blend of claim 8 wherein the halogenated homopolycarbonate is a tetrabromobisphenol A-based homopolycarbonate.

10. The halogen-containing, aromatic copolycarbonate blend of claim 1 wherein said halogen-containing compound is a monomeric halogen-containing compound.

11. The halogen-containing, aromatic copolycarbonate blend of claim 10 wherein the monomeric halogen-containing compound is decabromodiphenyl ether.

12. The halogen-containing, aromatic copolycarbonate blend of claim 1 wherein the aromatic diphenol-aromatic thiodiphenol copolycarbonate contains from about 2 to 50 mol % of the aromatic thiodiphenol, based on the total mols of diphenol used in the preparation of said aromatic diphenol-aromatic thiodiphenol copolycarbonate.

13. The halogen-containing, aromatic copolycarbonate blend of claim 1 wherein the aromatic thiodiphenol is 4,4'-thiodiphenol.

14. The halogen-containing, aromatic copolycarbonate blend of claim 1 wherein the aromatic diphenol of said aromatic diphenol-aromatic thiodiphenol copolycarbonate is bisphenol A.

15. The halogen-containing, aromatic copolycarbonate blend of claim 1 wherein the halogen-containing compound is a bromine- or chlorine-containing compound.

16. The halogen-containing, aromatic copolycarbonate blend of claim 15 wherein the halogen-containing compound is a bromine-containing compound.

17. The halogen-containing, aromatic copolycarbonate blend of claim 1 wherein about 0.01 to 3 wt. % of a sulfonic or carboxylic acid salt, based on the weight of the aromatic copolycarbonate blend, is present.

18. The halogen-containing, aromatic copolycarbonate blend of claim 17 wherein about 0.05 to 1 wt. % of a sulfonic or carboxylic acid salt, based on the weight of the aromatic copolycarbonate blend, is present.

19. The halogen-containing, aromatic copolycarbonate blend of claim 17 wherein the sulfonic or carboxylic acid salt is a perfluoro sulfonic or carboxylic acid salt.

20. The halogen-containing, aromatic copolycarbonate blend of claim 19 wherein the perfluoro sulfonic or carboxylic acid salt is a potassium or sodium perfluoroalkane sulfonate.

21. The halogen-containing, aromatic copolycarbonate blend of claim 20 wherein the perfluoro sulfonic or carboxylic acid salt is potassium or sodium perfluorobutane sulfonate.

22. The halogen-containing, aromatic copolycarbonate blend of claim 1 wherein said blend contains a sufficient amount of the halogen-containing compound to produce an about 1 to 5 wt. % halogen content and about 0.05 to 1 wt. % of a perfluoro sulfonic or carboxylic acid salt, based on the weight of the aromatic copolycarbonate blend.

23. A process for preparing a halogen-containing aromatic copolycarbonate blend having improved flame retardancy and critical thickness properties comprising intimately blending (a) an aromatic diphenol-aromatic thiodiphenol copolycarbonate comprising the reaction product of
(i) an aromatic diphenol having the structural formula

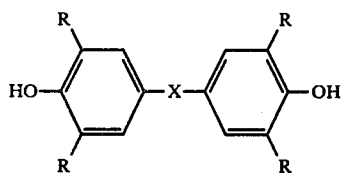

wherein
R is identical or different and denotes H or $C_1$-$C_4$-alkyl, and
wherein
X is a bond, $C_1$-$C_8$-alkylene, $C_2$-$C_8$-alkylidene, $C_5$-$C_{15}$-cycloalkylene, $C_5$-$C_{15}$-cycloalkylidene, —$SO_2$—, —SO—, —CO— or

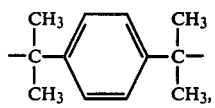

(ii) an aromatic thiodiphenol having the structural formula

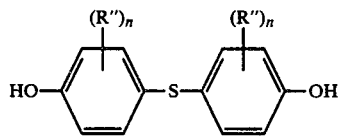

wherein
R'', which may be identical or different, is H or $C_1$-$C_4$-alkyl, and
n is 0, 1 or 2, and
(iii) a member selected from the group consisting of carbonyl bromide, phosgene, bischloroformic esters of (i) or (ii) and diaryl carbonates
(b) with a sufficient amount of halogen-containing compound to produce a blend having an about 0.01 to 8 wt. % halogen content, based on the weight of the aromatic copolycarbonate blend.

24. The process of claim 23 wherein the halogen-containing compound is a bromine- or chlorine-containing compound.

25. The process of claim 24 wherein the halogen-containing compound is a bromine-containing compound.

26. The process of claim 23 wherein about 0.01 to 3 wt. % of a perfluoro sulfonic or carboxylic acid salt, based on the weight of the aromatic copolycarbonate blend, is present.

27. The process of claim 26 wherein the perfluoro sulfonic or carboxylic acid salt is a potassium or sodium perfluoroalkane sulfonate.

28. The process of claim 27 wherein the organic acid salt is potassium or sodium perfluorobutane sulfonate.

29. The process of claim 23 wherein said blend contains a sufficient amount of the halogen-containing compound to produce an about 1 to 5 wt. % halogen content and 0.05 to 1 wt. % of a perfluoro sulfonic or carboxylic acid salt, based on the weight of the aromatic copolycarbonate blend.

30. A halogen-containing, aromatic copolycarbonate blend comprising
(a) an aromatic diphenol-aromatic thiodiphenol copolycarbonate comprising the reaction product of
(i) an aromatic diphenol having the structural formula

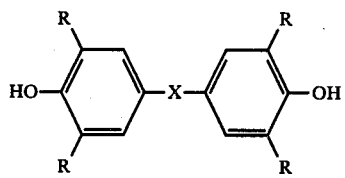

wherein
R is identical or different and denotes H or $C_1$-$C_4$-alkyl, and wherein
X is a bond, $C_1$-$C_8$-alkylene, $C_2$-$C_8$-alkylidene, $C_5$-$C_{15}$-cycloalkylene, $C_5$-$C_{15}$-cycloalkylidene, —$SO_2$—, —SO—, —CO— or

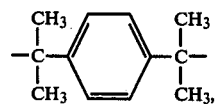

(ii) an aromatic thiodiphenol having the structural formula

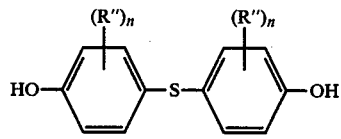

wherein
R'', which may be identical or different, is H or $C_1$-$C_4$-alkyl, and
n is 0, 1 or 2, and
(iii) a member selected from the group consisting of carbonyl bromide, phosgene, bischloroformic esters of (i) or (ii) and diaryl carbonates
(b) intimately blended with an effective amount of a bromine- or chlorine-containing compound whereby the critical thickness and flammability properties of the halogen-containing, aromatic copolycarbonate blend is improved.

31. The halogen-containing, aromatic copolycarbonate blend of claim 30 wherein said blend contains a sufficient amount of the bromine- or chlorine-containing compound to produce an about 0.01 to 8 wt. % bromine or chlorine content, based on the weight of the aromatic copolycarbonate blend.

* * * * *